United States Patent
Al-Mahshi et al.

(10) Patent No.: US 11,460,082 B2
(45) Date of Patent: Oct. 4, 2022

(54) SELF-LOCK HIGH-EFFICIENT ROTARY TO LINEAR MECHANISM

(71) Applicant: AKEBONO BRAKE INDUSTRY CO., LTD, Tokyo (JP)

(72) Inventors: Waleed Mahmoud Al-Mahshi, Novi, MI (US); Aurelian Bahmata, South Lyon, MI (US)

(73) Assignee: AKEBNON BRAKE INDUSTRY CO., LTD., Tokyo (JP)

( * ) Notice: Subject to any disclaimer, the term of this patent is extended or adjusted under 35 U.S.C. 154(b) by 218 days.

(21) Appl. No.: 16/915,375

(22) Filed: Jun. 29, 2020

(65) Prior Publication Data

US 2021/0404524 A1 Dec. 30, 2021

(51) Int. Cl.
*F16D 65/16* (2006.01)
*F16D 121/24* (2012.01)
*F16D 125/40* (2012.01)

(52) U.S. Cl.
CPC .......... *F16D 65/16* (2013.01); *F16D 2121/24* (2013.01); *F16D 2125/40* (2013.01)

(58) Field of Classification Search
CPC .. F16D 65/16; F16D 2121/24; F16D 2125/40; F16D 2125/50; Y10T 4/1978; Y10T 4/1974; Y10T 4/1869; Y10T 4/1963; Y10T 403/168; Y10T 403/169; Y10T 225/287; Y10T 225/277; Y10T 74/18576–74/18616
See application file for complete search history.

(56) References Cited

U.S. PATENT DOCUMENTS

| | | | |
|---|---|---|---|
| 3,211,263 A * | 10/1965 | Harrison | F16D 65/567 188/71.9 |
| 3,393,200 A | 7/1968 | Bachmann | |
| 3,604,058 A * | 9/1971 | Fischbach | B29C 45/6714 425/150 |
| 3,688,875 A | 9/1972 | De Hoff et al. | |
| 3,783,981 A | 1/1974 | Burgdorf | |
| 3,805,924 A * | 4/1974 | Gambardella | F16D 65/567 188/71.9 |
| RE28,881 E * | 6/1976 | Farr | F16D 65/18 188/196 D |

(Continued)

FOREIGN PATENT DOCUMENTS

| | | |
|---|---|---|
| CN | 110654363 A | 1/2020 |
| DE | 10137880 A1 | 5/2002 |
| DE | 102009028568 A1 | 5/2018 |

OTHER PUBLICATIONS

Extended European Search Report, dated Oct. 21, 2021, Application No. 21169844.4.

*Primary Examiner* — Robert A. Siconolfi
*Assistant Examiner* — James K Hsiao
(74) *Attorney, Agent, or Firm* — The Dobrusin Law Firm, P.C.; Bryan S. Lemanski

(57) ABSTRACT

A rotary to linear actuator comprising: (a) a nut having a threading; (b) a spindle having an external threading and positioned at least partially within the nut; and (c) a drive shaft in communication with the nut to rotate the nut; wherein rotation of the drive shaft rotates the nut, and the threading of the nut engages the external threading of the spindle to move the spindle axially away from the drive shaft to drive a piston.

17 Claims, 8 Drawing Sheets

(56) References Cited

U.S. PATENT DOCUMENTS

| | | | | |
|---|---|---|---|---|
| 3,991,859 | A * | 11/1976 | Coulter | F16D 65/18 188/71.9 |
| 4,256,206 | A * | 3/1981 | Maehara | F16D 65/18 188/71.9 |
| 4,392,557 | A | 7/1983 | Franke | |
| 5,219,047 | A | 6/1993 | Fouilleux et al. | |
| 5,348,123 | A | 9/1994 | Takahashi et al. | |
| 6,093,361 | A * | 7/2000 | Schad | B29C 45/68 425/589 |
| 6,116,103 | A * | 9/2000 | Heckel, Jr. | F16H 25/20 188/69 |
| 6,305,508 | B1 * | 10/2001 | Schumann | B60T 13/741 188/72.8 |
| 6,811,002 | B2 * | 11/2004 | Nakayama | F16D 65/18 188/71.9 |
| 8,069,961 | B2 * | 12/2011 | Watada | F16D 65/18 188/71.9 |
| 8,573,370 | B2 * | 11/2013 | Maehara | F16D 65/183 188/71.9 |
| 8,616,348 | B2 * | 12/2013 | Winkler | F16H 25/2233 188/72.8 |
| 9,163,684 | B2 * | 10/2015 | Hong | F16D 65/543 |
| 9,340,190 | B2 * | 5/2016 | Qian | B60T 1/065 |
| 9,587,693 | B2 * | 3/2017 | Wu | F16D 55/226 |
| 9,732,812 | B2 * | 8/2017 | Giering | F16D 65/14 |
| 9,850,971 | B1 | 12/2017 | Demorais et al. | |
| 9,874,257 | B2 | 1/2018 | Son et al. | |
| 10,060,488 | B2 | 8/2018 | Lee et al. | |
| 10,119,600 | B2 * | 11/2018 | Urban | B23C 3/28 |
| 10,167,914 | B2 | 1/2019 | Hyun et al. | |
| 10,184,536 | B2 * | 1/2019 | Chelaidite | F16D 65/183 |
| 10,295,004 | B2 | 5/2019 | Chelaidite et al. | |
| 10,309,471 | B2 | 6/2019 | Kim | |
| 10,421,445 | B2 | 9/2019 | Kim | |
| 10,428,888 | B2 * | 10/2019 | Al-Mahshi | F16D 55/226 |
| 10,604,133 | B2 * | 3/2020 | Deberling | F16H 25/20 |
| 11,054,007 | B2 * | 7/2021 | Shin | F16H 25/2006 |
| 2004/0091570 | A1 | 5/2004 | Wohlrab | |
| 2007/0045062 | A1 * | 3/2007 | Watada | F16D 65/567 188/72.8 |
| 2009/0133975 | A1 | 5/2009 | Gilles | |
| 2012/0032559 | A1 | 2/2012 | Hino | |
| 2012/0111673 | A1 * | 5/2012 | Giering | F16D 65/18 74/424.81 |
| 2012/0325597 | A1 | 12/2012 | Giering et al. | |
| 2016/0131212 | A1 * | 5/2016 | Yamasaki | F16D 55/225 188/69 |
| 2017/0097071 | A1 * | 4/2017 | Galehr | F16H 25/24 |
| 2018/0345939 | A1 * | 12/2018 | Schmitt | B60T 13/745 |
| 2019/0256072 | A1 | 8/2019 | Hyeon | |
| 2019/0331180 | A1 * | 10/2019 | Chelaidite | F16H 25/24 |
| 2020/0238962 | A1 * | 7/2020 | Stoehr | F16D 55/226 |
| 2021/0197784 | A1 * | 7/2021 | Drumm | F16H 25/2015 |

\* cited by examiner

SELF-LOCK HIGH-EFFICIENT ROTARY TO LINEAR MECHANISM

FIELD

The present teachings generally relate to a brake system, and more particularly, to a rotary to linear mechanism driving a brake piston.

BACKGROUND

Various brake systems are used in a wide array of vehicle and/or transportation applications. These brake systems may include one or more pistons, a floating caliper housing or an opposed piston (or fixed) caliper housing, or a combination thereof. Often these brake systems will also include a rotary to linear (RTL) actuator.

The RTL actuator may be powered by a motor directly or indirectly connected to the RTL actuator. During a brake apply, the RTL actuator may receive the power and at least a portion of the actuator may be rotated. This rotation may then be converted through one or more stages in the actuator into a linear movement to drive a piston towards one or more brake pads or shoes, thereby creating a clamping force between the one or more brake pads and a rotor or drum. As a result of the clamping force, a backdrive may exist that causes the piston to disengage the brake pad and move in a release direction away from the brake pad (i.e., toward an initial position prior to the brake apply).

Frequently, the RTL actuator will utilize a spindle and a nut to convert the rotational movement into a linear movement. The spindle and the nut may often include self-locking threads that allow the nut to drive the piston yet prevent backdrive of the piston and the nut after a clamping operation. However, due to the self-locking threads the nut and the spindle are unable to convert the rotational movement into linear movement with high efficiency. As a result, brake systems may forego the self-locking threading and utilize a higher efficiency nut and spindle combination, frequently utilizing one or more ball bearings to improve movement. Unfortunately, by improving the efficiency and removing the self-locking threading, backdrive may still prevent a full clamping force from being applied by the brake pads.

Thus, there remains a need for an RTL actuator that may move a piston in a highly efficient manner. What is needed is an RTL actuator having a nut and spindle combination free of self-locking threading to efficiently drive a piston. There also remains a need for an RTL actuator that prevents backdrive of the piston during a clamping operation. What is needed is an RTL actuator having a secondary component that allows for clamping but prevents unwanted movement of the piston in a release direction.

SUMMARY

The present teachings meet one or more of the present needs be providing a rotary to linear actuator comprising: (a) a nut having a threading; (b) a spindle having an external threading and positioned at least partially within the nut; and (c) a drive shaft in communication with the nut to rotate the nut; wherein rotation of the drive shaft rotates the nut, and the threading of the nut engages the external threading of the spindle to move the spindle axially away from the drive shaft to drive a piston.

The present teachings provide a rotary to linear actuator, wherein: the spindle is secured to a flange and the flange contacts an inner wall of the piston to drive the piston; the nut and the drive shaft include an anti-rotation feature to transfer a rotation of the drive shaft to the nut; a lead screw is positioned within a channel of the spindle so that threading of the lead screw engages internal threading of the spindle; the piston is moved to a clamping position in a clamping direction to engage a brake pad of a brake system, and the threading of the lead screw self-locks with the internal threading of the spindle to prevent backdrive of the spindle in a release direction opposite the clamping direction; the threading of the nut and the external threading of the spindle are free of self-locking that prevents backdrive; a ball screw is positioned between the nut and the spindle to engage the threading of the nut and the external threading of the spindle; the flange includes an anti-rotation feature that engages the piston and prevents rotation of the flange relative to the piston, or vice versa; the spindle moves freely along the threading of the lead screw in a clamping direction, but the threading of the lead screw and the internal threading of the spindle prevent the spindle from prematurely moving in an opposing release direction due to backdrive caused by a clamping operation; the nut and the spindle are at least partially positioned within a cavity of the piston; the nut and the drive shaft remain axially stationary and rotate about an axis of rotation; or a combination thereof.

Additionally, the present teachings meet one or more of the present needs by providing a rotary to linear actuator comprising: (a) a first nut having a threading; (b) a second nut having a threading; (c) a spindle having a threading and positioned at least partially within the first nut and the second nut; and (d) a drive shaft connected to the spindle to rotate the spindle; wherein rotation of the drive shaft during a clamping operation rotates the spindle, and the threading of the spindle engages the threading of the first nut to move the first nut axially away from the drive shaft to drive a piston in a clamping direction; and wherein backdrive of the piston and the first nut in a release direction opposing the clamping direction is prevented by the threading of the second nut self-locking with the threading of the spindle.

The threading of the first nut may be free of self-locking with the threading of the spindle. The second nut may move freely along the threading of the spindle in the clamping direction during the clamping operation. The second nut may remain axially stationary during operation of the rotary to linear actuator. An anti-rotation feature between the first nut and the second nut may prevent rotation of the second nut relative to the first nut, or vice versa. The second nut may be positioned at least partially within the first nut, may be located adjacent to the first nut, or both. The first nut and the spindle may be at least partially positioned within a cavity of the piston. Additionally, one or more ball bearings may be positioned between the first nut and the spindle to engage the threading of the first nut and the threading of the spindle.

Furthermore, the present teachings meeting one or more of the present needs by providing: an RTL actuator that may move a piston in a highly efficient manner; an RTL actuator having a nut and spindle combination free of self-locking threading to efficiently drive a piston; an RTL actuator that prevents backdrive of the piston during a clamping operation; and an RTL actuator having a secondary component that allows for clamping but prevents unwanted movement of the piston in a release direction.

DETAILED DESCRIPTION

Figure 1:
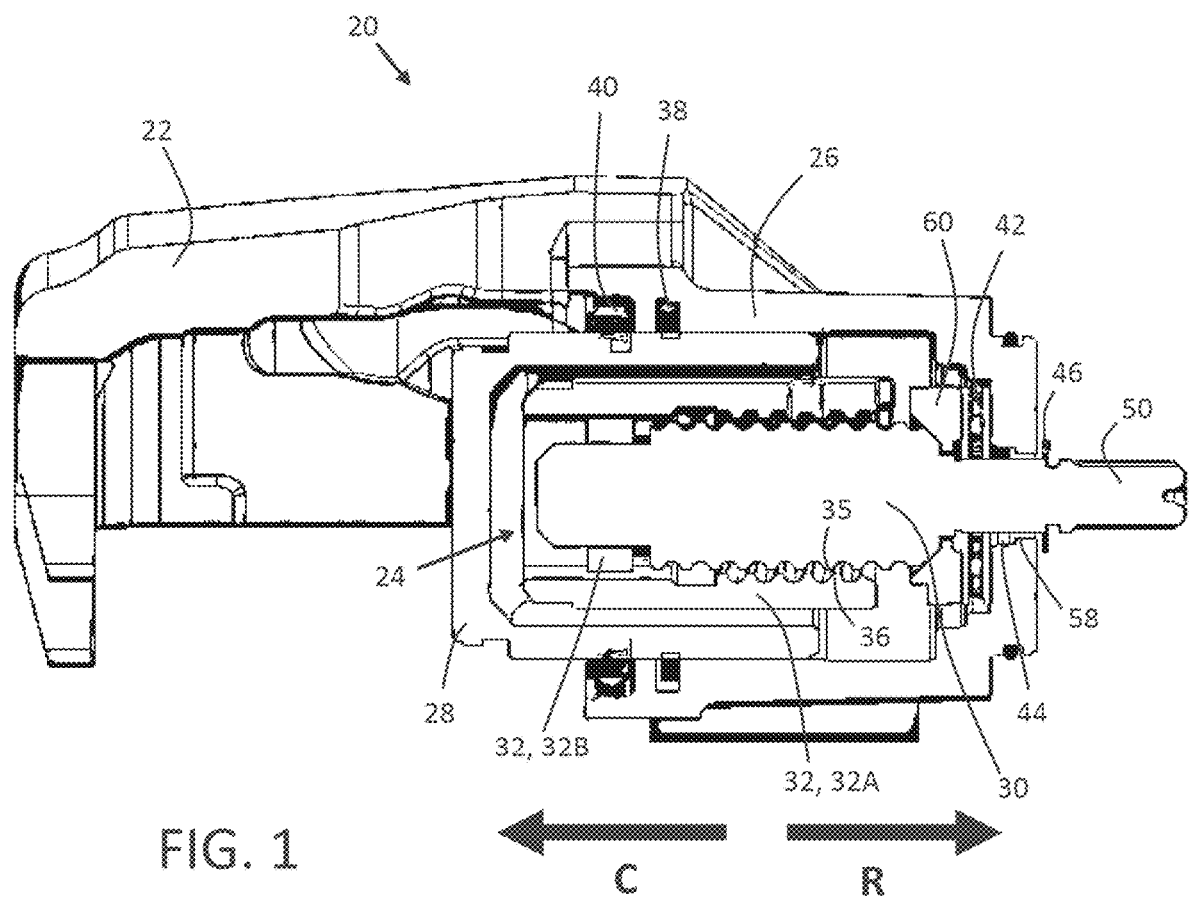
FIG. 1 is a cross-section of a brake system.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The teachings herein relate generally to a brake system that functions to decelerate a vehicle, such as a car, truck, bus, train, airplane, or a combination thereof. The brake assembly may also be configured to maintain a vehicle position when stationary (i.e., parked). The brake system may include one or more stationary components, one or more dynamic components, or both. The brake system may utilize one or more brake pads or brake shoes to engage a rotor or disc of a vehicle wheel. The brake pads or brake shoes may apply a clamping load to the moving rotor or disc to decelerate and eventually stop the vehicle. Similarly, the brake pads or brake shoes may apply a continuous load to the rotor or disc when the vehicle is stationary to maintain a position of the vehicle.

The brake system may have any desired configuration. It is envisioned that the teachings herein may relate to any number of brake systems. The brake system may include one or more brake calipers, one or more pistons, or both. The brake system may include a fixed opposed brake caliper, a floating caliper, or both. The brake system may include a single piston, twin pistons, more than two pistons, or a combination thereof. The brake system may be an electrical brake system with a hydraulic load application or a fully electromechanical brake system free of a hydraulic load application.

The brake system may include a piston. The piston may function to drive brake pads or brake shoes of the brake system towards the rotor or disc of a vehicle wheel. The piston may apply a load on the brake pads or brake shoes to decelerate the rotor or disc of the vehicle wheel. The piston may be electromechanically drive with or without a hydraulic load application. The piston may axially substantially parallel to an axis of rotation of the rotor or the disc Any desired size and/or shape piston may be utilized with the present teachings. However, it is envisioned that the piston may include one or more anti-rotation features to prevent unwanted rotation of the piston relative to the brake pads or shoes, or vice versa. The anti-rotation feature may be a notch or groove along an exterior face of the piston the contacts the brake pads or brake shoes. Alternatively, or additionally, the anti-rotation feature may be a friction surface that substantially prevents slipping of the piston when contacting the brake pads or brake shoes. However, it should be noted that the anti-rotation features may be present anywhere along the piston and may be any shape to mate with the brake pads or brake shoes.

The piston may be positioned at least partially within a caliper housing. For example, the caliper housing may include a piston bore that partially encloses the piston within the caliper housing. The piston may move axially within the piston bore to contact the brake pads or brake shoes. Additionally, the piston bore may prevent unwanted debris or moisture from contacting the piston and inhibiting performance of the brake system.

The piston may be driven by a rotary to linear (RTL) actuator. The RTL actuator may function to translate a rotational movement into a linear movement to axially drive the piston towards and/or away from the brake pads or brake shoes. The RTL actuator may include one or more components that move axially, one or more components that rotate about an axis yet remain axially stationary, or both. The RTL actuator may include one or more stages to convert the rotational movement into a linear movement. The RTL actuator may include one or more mechanical components, one or more electrical components, or both.

The RTL actuator may be positioned anywhere near the piston to drive the piston. The RTL actuator may be positioned adjacent to the piston such that a dynamic component of the RTL actuator may contact and drive the piston. However, it is envisioned that at least a portion of the RTL actuator may be positioned within a cavity of the piston. Thus, the RTL actuator may be at least partially protected by the piston and may drive the piston by contacting an inner wall of the piston. The RTL actuator may also retract the piston during a release operation so that the piston disengages the brake pads or brake shoes and/or the brake pads or brake shoes disengage the rotor or disc.

The RTL actuator may be actuated based upon a force applied to a drive shaft. The drive shaft may function to receive an external force an initiate movement of one or more stages of the RTL actuator. The drive shaft may be rotated by an external motor or motor gear unit (MGU) during a brake apply or a brake release operation. The drive may then translate that rotation into rotation or one or more components of the RTL actuator.

The drive shaft may extend out of the caliper housing to communicate with the MGU. The drive shaft may be received by a portion of the MGU so that the MGU may rotate the drive shaft. To maintain a position of the drive shaft during operation, the drive shaft may extend through an aperture of the caliper housing or the piston bore. One or more O-rings, bushings, or both may be located within the aperture of the caliper housing or the piston bore or positioned adjacent to the aperture of the caliper housing or the piston bore. Additionally, a clip may secure the drive shaft in place relative to the caliper housing or an external surface of the piston bore.

The drive shaft may also be supported by one or more bearings. The bearings may function to decrease friction during rotation of the drive shaft so that the drive shaft may efficiently actuate the RTL actuator. The bearing may be any desired type of bearing. However, it is envisioned that the drive shaft may extend through one or more thrust bearings positioned within or adjacent to the piston bore.

The drive shaft may rotate a spindle of the RTL actuator. The spindle may function to communicate with one or more nuts to axially move the one or more nuts. The spindle may function to axially drive the piston during a clamping or release operation. The spindle may be monolithically formed with the drive shaft or may be connected to the drive shaft. The spindle may be at least partially positioned within a cavity of the piston.

It is contemplated that the spindle may be coaxial with the drive shaft so that rotation of the drive shaft directly rotates the spindle along the axis of rotation of the drive shaft. The spindle may then engage one or more components of the RTL actuator, such as a nut, to axially move the nut and thus drive the piston. As such, the spindle may remain axially stationary during operation of the RTL actuator.

Alternatively, the spindle may be driven by one or more additional components of the RTL actuator. Thus, the spindle may axially move away from the drive shaft towards the piston to move the piston directly or indirectly. Therefore, the spindle may be free to move towards and/or away from the drive shaft during actuator of the RTL actuator.

The spindle may vary in size and/or shape depending on the type of caliper housing and piston of the brake system. The spindle may include one or more steps. For example, the spindle may include a tapered portion having a diameter less than a diameter of a remaining segment of the spindle. Therefore, the spindle may beneficially engage or communicate with different components along different segments of the spindle. For example, a segment of the spindle having a larger diameter may engage a first nut and a second segment of the spindle having a smaller diameter may engage a second nut.

The spindle may communicate with one or more additional components via threading. The spindle may include threading along an external portion of the spindle. The spindle may also include an internal threading within a channel or cavity of the spindle. The external and internal threading may be similar or different. The external threading and/or the internal threading may include one or more sections having different threading types, spacing, or both. For example, the external threading may include a first section having self-locking threads while the external threading may also include a second section free of self-locking threads. Therefore, it is envisioned that the spindle may advantageously communicate with different components to either prevent backdrive using self-locking threads or efficiently drive one or more components with threading free of self-locking threads.

The external threading and/or the internal threading of the spindle may communicate with additional components to drive the additional components, drive the spindle, or both. The external threading and/or the internal threading may directly or indirectly communicate with additional components. For example, the external and/or internal threading of the spindle may directly engage threading of one or more nuts of the RTL actuator to axially move the spindle, axially move the one or more nuts, or both. Alternatively, or additionally, the external threading and/or the internal threading may engage threading of the one or more nuts through a bearing ring or one or more ball bearings. The bearing ring or the one or more ball bearings may be positioned between the spindle and one or more additional components, such as a nut. The bearing ring or the one or more ball bearings may function to promote movement of the spindle or the one or more additional components. The bearing ring or the one or more ball bearings may substantially decrease friction between the spindle and the one or more additional components.

The one or more additional components in communication with the spindle may be a nut. The nut may function to axially drive the spindle. The nut may function to drive the piston based upon rotation of the spindle. Therefore, the nut may remain axially stationary during operation of the RTL actuator or may move along its axis during operation. The nut be positioned adjacent to the spindle or may encompass at least a portion of the spindle. For example, the spindle may be nested within the nut while the drive shaft connected to the spindle extends outwardly away from the nut to connect to the MGU. While the spindle may be positioned within the nut, the nut may also be nested within a cavity of the piston. Therefore, all or most of the RTL actuator may be located within the piston to protect from debris, moisture, other contaminants, or a combination thereof. Additionally, by placing the RTL actuator within the piston, one or more fluids promoting movement of the piston, the RTL actuator, or both may remain within the piston, thereby preventing leaking of the fluids and potentially causing the RTL actuator and/or the piston from locking.

The nut may include threading. The threading of the nut may function to communicate with threading of the spindle. The threading of the nut may directly engage threading of the spindle, indirectly engage threading of the spindle via one or more ball bearings or a ball screw, or both. Rotation of the nut may cause the threading of the nut to engage threading of the spindle, thereby axially moving the spindle. Alternatively, the threading of the spindle may be rotated to engage the threading of the nut to axially move the nut. Thus, the present teachings may beneficially utilize the spindle, the nut, or both as a primary driver for receiving a rotational movement and converting the rotational movement into a linear movement. However, it should also be noted that rotation of the nut may initiate rotation of the spindle free of axially movement, or vice versa.

The nut may also include one or more additional features to facilitate operation of the RTL actuator. The nut may include one or more anti-rotation features. The anti-rotation features may engage the piston, one or more additional components, or both. The anti-rotation features may prevent rotation of the nut relative to the piston, or vice versa during operation of the RTL actuator. The anti-rotation features may also function to help with assembly of the RTL actuator. For example, the anti-rotation features of the nut may align with anti-rotation features of the piston to ensure proper alignment of the RTL actuator relative to the piston when installed. Once installed, the anti-rotation features of the nut and the piston may prevent unwanted shifting during operation. It is envisioned that any number of anti-rotation features may be present. For example, the anti-rotation features may be linear segments along an otherwise circular shape. The anti-rotation features may be a friction surface to decrease slippage between the nut and the piston. The friction surface may also engage the piston with a press-fit condition to substantially decrease movement of the piston relative to the nut, or vice versa.

While a single nut may be discussed above, a plurality of nuts may be utilized in the RTL actuator. For example, the RTL actuator may include a first nut and a second nut. The first nut and the second nut may have similar structures or may differ to facilitate different operations of the RTL actuator at different conversion stages. During one or more stages of a clamping operation the first nut may drive the spindle or may be driven by the spindle to move the piston towards the brake pads or brake shoes. The first nut, the spindle, or both may be biased by a pre-loaded spring of the RTL actuator. The spring may help move the first nut, the spindle, or both during a clamping operation. The first nut and at least a portion of the spindle engaging the first nut may be free of self-locking threads to efficiently move the spindle and/or the nut towards the piston.

During the one or more stages, the second nut may freely move along or move with the second nut and/or the spindle. The second nut may also be biased by a spring the help move the second nut during a clamping operation. The spring may be positioned along the spindle between the spindle and the second nut. The substantially free movement of the second nut may be facilitated by threading of the second nut engaging external threading of the spindle. However, the second nut may also move axially or remain stationary based upon an anti-rotation feature between the first nut and the second nut. The anti-rotation feature may be like those discussed above between the piston and the first nut. Thus, the first nut and the second nut may move simultaneously with the first nut or the second nut may remain stationary during movement of the first nut.

Once the piston is moved to a final clamping position (i.e., abutting the brake pads or brake shoes and applying a clamping load to the rotor or disc), a backdrive force may be present. The backdrive may result from the clamping operation. If the backdrive remains unchecked, the force may drive the piston, the first nut, the spindle, or a combination thereof back in a release direction opposing the clamping direction—a direction away from the brake pads or brake shoes, thereby decreasing a clamping force on the brake or rotor. While the first nut used to drive the piston or the spindle may be free of self-locking threads, advantageously the second nut may include self-locking threads that engage the spindle. The second nut may thus prevent the backdrive force from translating through the first nut and/or the first spindle. Therefore, the clamping force may remain consistent and backdrive may be prevented. Thus, the RTL actuator taught herein may beneficially drive the piston with relatively high efficiency using a first nut free of self-locking threads that may deter movement of the RTL actuator, yet prevent backdrive using a second nut having self-locking threads that engage the spindle (i.e., a lower efficiency nut).

The second nut may be positioned anywhere relative to the first nut. The second nut and the first nut may both engage the spindle. The second nut and the first nut may engage the spindle along different segments of the spindle. The second nut may be at least partially nested in the first nut or the first nut may be at least partially nested in the second nut. The second nut may be located adjacent to the first nut or may abut the first nut. The second nut may also be threading into the first nut, or vice versa. Additionally, the second nut may be full or partially enclosed within the cavity of the piston.

While a first nut and a second nut are discussed herein, the RTL actuator may utilize more than two nuts. The plurality of nuts may be activated during different stages of articulation of the RTL actuator to promote driving the piston, prevent backdrive, promote actuation or one or more components of the RTL actuator, or a combination thereof.

The nuts may also include one or more vents, notches, apertures, grooves, or a combination thereof. The vents, notches, apertures, grooves, or a combination thereof may help with actuation of the RTL actuator, may vent the RTL actuator to prevent overheating or locking, may facilitate movement of one or more fluids within the RTL actuator, or a combination thereof.

The RTL actuator may also include a lead screw. The lead screw may function to help move the spindle axially during a clamping operation, a release operation, or both. The lead screw may function to prevent backdrive of the spindle and/or additional components of the RTL actuator when a clamping force is applied. The lead screw may axially move during actuation of the RTL actuator or the lead screw may remain axially stationary during actuation of the RTL actuator. The lead screw may rotate or may remain entirely stationary during operation of the RTL actuator.

The lead screw may be positioned within a channel of the spindle. Alternatively, the spindle may be positioned within a channel of the lead screw. The lead screw may be positioned within the cavity of the piston, within one or more nuts, or both. The lead screw may be used in conjunction with, or in lieu of, one or more nuts. For example, the RTL actuator may use a first nut to drive the piston or the spindle and use a lead screw to prevent backdrive of the spindle or the first nut. Alternatively, the RTL actuator may use a second nut along with or instead of the lead screw to prevent backdrive.

The lead screw may include threading. The threading of the lead screw may function to engage threading of the spindle, threading of one or more nuts, or a combination thereof. The threading of the lead screw may engage internal threading of the spindle, external threading of the spindle, or both. The threading of the lead screw may be self-locking or may be free of self-locking threads. Thus, the lead screw may help efficiently drive the piston directly or indirectly, may help prevent backdrive, or both.

The lead screw may be secured to the drive shaft. For example, the lead screw may include a collar having an aperture that receives a portion of the lead screw. Thus, the lead screw may be rotated based upon rotation of the drive shaft. As such, it is envisioned that the lead screw may rotate simultaneously with the drive shaft and also with a nut being driven by the drive shaft. The rotation of both the lead screw and the nut may move the spindle towards the piston in a more efficient manner.

It is also envisioned that the lead screw may at least incrementally rotate relative to the drive shaft. While the drive shaft may be secured to the lead screw and rotate the lead screw, a clutch connecting the drive shaft and the lead screw may allow for incremental rotation of the lead screw relative to the drive shaft. It should be noted that any desired incremental rotation may be configured based on a given application. However, while incremental rotation may be possible, the lead screw may still be engaged to the drive shaft to prevent free rotation of the lead screw relative to the drive shaft. Additionally, the lead screw may incrementally rotate relative to the drive shaft to help aid self-locking of the lead screw and the spindle of the rotary to linear actuator.

The clutch may secure the lead screw to the drive shaft along with promote slight rotation of the lead screw. The rotation may be facilitated by keying of the lead screw located within keyholes of the drive shaft. The keying may be smaller than the keyholes so that the keying may move within the keyholes during operation of the actuator. As such, it is envisioned that the keyholes may be adjusted in dimensions to allow for a desired amount of rotation of the lead screw. The keying may be any size and shaft. As such, the clutch may be a 1-way clutch, 2-way clutch, or both. Additionally, the clutch may be a ball bearing clutch, ball ramp clutch, geometry clutch, or any combination thereof. It is envisioned that the clutch may be any mechanism that allows relative rotation between the lead screw and the drive shaft, between the lead screw and the ball screw, or both. Thus, the clutch may allow for any desired incremental rotation of the lead screw and/or the drive shaft in a clockwise direction, a counterclockwise direction, or both.

The clutch may also be a friction clutch so that frictional engagement between the lead screw and the drive shaft are present. The lead screw may engage a portion of the drive shaft via a bushing. The bushing may be a conical bushing, barrel bushing, stepped bushing, hourglass bushing, or a combination thereof. It is envisioned that the bushing may be any desired shape to ensure frictional engagement between the lead screw and the drive shaft. As such, the frictional engagement may ensure contact between the lead screw and the drive shaft during, before, and after operation of the actuator. The contact between the lead screw and the drive shaft may be anywhere. For example, the contact of the lead screw and the drive shaft may be located along a longitudinal axis of the lead screw and the drive shaft, offset from the longitudinal axis of the lead screw and the drive shaft, or both. However, advantageously, the present teachings allow for a clutch that ensures proper contact between the lead screw and the drive shaft.

The spindle, one or more nuts, or a combination thereof may be connected to a flange. The flange may function to engage the piston during a clamping operation. The flange may function to prevent rotation of the RTL actuator relative to the piston, or vice versa. The flange may be connected to the one or more nuts, the spindle, or a combination thereof. Thus, the flange may axially move during a clamping operation, a release operation, or both.

The flange may be shaped substantially similar to an inner cavity of the piston to engage the inner walls of the piston. The flange may include one or more anti-rotation features that mate with the piston to prevent rotation of the piston relative to the flange, or vice versa. The anti-rotation features may be similar to the anti-rotation features of the first nut, the second nut, the piston, or a combination thereof. The flange may also include one or more anti-rotation features that align with an anti-rotation feature of a nut so that the flange and the nut may be aligned, rotation of the nut relative to the flange is prevent, or both.

The flange may be at least partially positioned within the cavity of the piston. The flange may be at least partially nested in one or more of the nuts. The flange may include one or more channels, one or more apertures, one or more vents, one or more notches, one or more contoured surfaces, one or more channels, or a combination thereof. The flange may be secured to the spindle, one or more nuts, the lead screw, or a combination thereof via one or more clips. Alternatively, or additionally, the flange may be screwed into or onto one or more nuts, the spindle, the lead screw, or a combination thereof.

Turning now to the figures, FIG. 1 illustrates a cross-section of a brake system 20. The brake system 20 includes a caliper housing 22. The caliper housing 22 may be configured to house one or more brake pads (not shown). One or more of the brake pads may be actuated to provide a clamping force on a rotor by a piston 28 positioned within a piston bore 26 of the caliper housing 22. As shown, a gap between the piston 28 and the piston bore 26 may be protected by a boot 40 and a piston seal 38. The piston 28 may move in a clamping direction (C) so that the brake pads engage a rotor (not shown). The piston 28 may also move in a release direction (R) so that the brake pads may disengage the rotor.

The piston 28 may be moved in the clamping direction (C) and the release direction (R) by a rotary to linear actuator 24. The rotary to linear actuator 24 may include a spindle 30 positioned at least partially within a cavity of the piston 28. The spindle 30 may be connected to a drive shaft 50 so that, when a motor gear unit (MGU; not shown) rotates the drive shaft 50, the spindle 30 also rotates within the cavity of the piston 28. As the spindle 30 rotates, external threading 35 of the spindle 30 engages threading 36 of a first nut 32A. It should be noted that while the external threading 35 of the spindle 30 may directly engage threading 36 of the first nut 32A, one or more ball bearings positioned between the spindle 30 and the first nut 32A may facilitate the spindle 30 indirectly engaging the first nut 32A via the ball bearings (see, e.g., FIG. 5). As the spindle 30 rotates and engages the first nut 32A, the first nut 32A moves in the clamping direction (C) to contact the piston 28. As a result, the piston 28 is then driven in the clamping direction (C) until the piston 28 contacts a brake pad and moves the brake pad into contact with the rotor. As the first nut 32A moves axially in the clamping direction (C), a second nut 32B freely moves axially in the clamping direction (C) based on threading between the second nut 32A and the spindle 30 and an anti-rotation feature between the second nut 32A and the first nut 32B.

Once the piston 28 has reached the final clamping position, current going to the MGU may be shut off to stop movement of the spindle 30. At this point backdrive may exist due to the applied force in the clamping direction (C), causing the first nut 32A to unintentionally move in the release direction (R). It should be noted that the backdrive may exist because of no self-locking existing between the external threading 35 of the spindle 30 and the threading 36 of the first nut 32A. As such, the first nut 32A may drive the piston 28 with a higher efficiency when compared to a nut 32 and spindle 30 combination having self-lock threading.

The backdrive force of the first nut 32A may attempt to transfer to the spindle 30 to cause disengagement of the piston 28 from the brake pad (i.e., move the piston 28 undesirably in the release direction (R)). To prevent disengagement of the piston 28, the second nut 32B may receive the backdrive force caused by the first nut 32A due to the anti-rotation feature between the first nut 32A and the second nut 32B. Additionally, self-lock threading may exist between the second nut 32B and the spindle 30 so that, when the first nut 32A applies the backdrive force to the second nut 32B, the second nut 32B prevents any unwanted movement of the spindle 30.

Therefore, it may be gleaned from the above description the second nut 32B may be of lower efficiency when compared to the first nut 32A due to the self-lock threading. However, the present teachings advantageously incorporate both a high efficiency first nut 32A to drive the piston 28 and a lower efficiency second nut 32B to prevent backdrive of the piston 28 and the first nut 32A.

Upon release, the drive shaft 50 and thus the spindle 30 are rotated in an opposite direction to the rotational direction for clamping. The backdrive force of the first nut 32A will then help rotate the spindle 30 and move the first nut 32A and the second nut 32B in the release direction (R) back to an original position.

Additionally, as illustrated in FIG. 1, the drive shaft 50 may extend out of the piston bore 26 through a bushing 44 and a bearing 42 that aid in rotating the spindle 30. The drive shaft 50 and the spindle 30 may remain axially in place with the help of an O-ring 58 and a clip 46 securing the drive shaft 50 to an external portion of the piston bore 26. Furthermore, a collar 60 may abut the bearing 42 and help maintain a position of the spindle 30 within the cavity of the piston 28.

Figure 2:
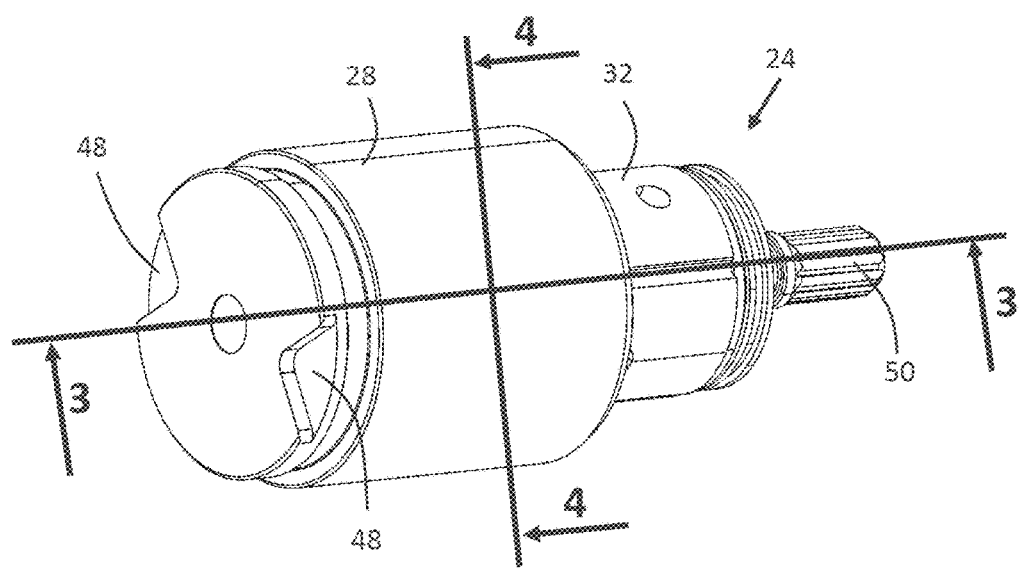
FIG. 2 is a perspective view of a rotary to linear actuator.

FIG. 2 illustrates a perspective view of a rotary to linear (RTL) actuator 24. The RTL actuator 24 includes a nut 32 positioned around a spindle (not shown) and located within a cavity of a piston 28. The spindle may be driven by a drive shaft 50 monolithically formed with the spindle. As discussed above regarding FIG. 1, when the spindle rotates, the nut 32 may drive the piston 28 in a desired direction to engage one or more brake pads. The piston 28 may also include one or more anti-rotation features 48 along an outer portion that engage the brake pad during operation and prevent rotation of the piston 28 relative to the brake pad, or vice versa.

Figure 3:
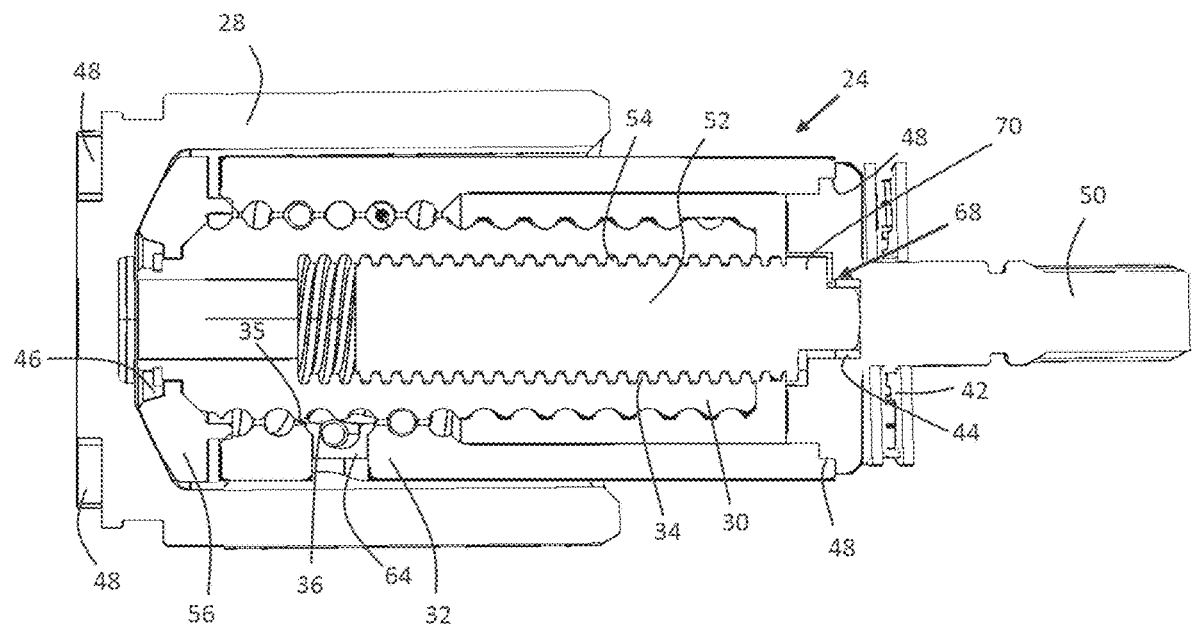
FIG. 3 is cross-section 3-3 of FIG. 2.

FIG. 3 illustrates cross-section 3-3 of the rotary to linear (RTL) actuator 24 of FIG. 2. The RTL actuator 24 includes a nut 32 positioned at least partially within a cavity of the piston 28. The nut 32 may be engaged to a drive shaft 50 of the RTL actuator extending through a bearing 42. The nut 32 may be configured to rotate based upon rotation of the drive shaft 50 due to one or more anti-rotation features 48 present between the drive shaft 50 and the nut 32.

During a clamping operation, the drive shaft 50 may be rotated by a motor gear unit (MGU; not shown). As the drift shaft 50 rotates, the nut 32 will also rotate. During rotation, threading 36 of the nut 32 may indirectly engage external threading 35 of a spindle 30 via a ball screw 64 positioned between the nut 32 and the spindle 30. As the nut 32 rotates, the spindle 30 may be driven axially to move a flange 56 into an inner wall of the piston 28 and drive the piston 28 towards one or more brake pads. It should be noted that a clip 46 may secure the flange 56 to the spindle 30 during operation.

Once the piston 28 reaches a clamping position and anti-rotation features 48 of the piston 28 contact the one or more brake pads, a backdrive force may exist, causing the nut 32 and thus the piston 28 to move undesirably in a release direction. To prevent the unwanted release, a lead screw 52 may be positioned within a channel of the spindle 30. As the backdrive force is applied from the nut 32 through the ball screw 64 to the spindle 30, the spindle 30 would normally be driven in a release direction because no self-lock threading exists between the nut 32 and the spindle 30. However, threading 54 of the lead screw 52 engages an internal threading 34 of the spindle 30 to self-lock, thereby preventing the spindle 30 from moving axially in the release direction (see FIG. 1 for directional references). Additionally, the lead screw 52 may include a clutch 68 that frictionally engages the lead screw 52 and the drive shaft 50 to help facilitate self-locking of the lead screw 52 and the spindle 30. The clutch 68 may include keying 70 that allows for a desired incremental rotation of the lead screw 52 relative to the drive shaft 50 within keyholes of the drive shaft 50 (see FIG. 14). Although the clutch 68 may allow for incremental rotation of the lead screw 52 relative to the drive shaft 50, the lead screw 52 remains frictionally engaged to the drive shaft 50 via a bushing 44 of the clutch 68. It should also be noted that the keying 70 may allow for any desired incremental rotation based on a given application.

During a release operation, the MGU rotates the drive shaft 50 in an opposite direction, causing the nut 32 to also rotate in the opposite direction. As a result, the spindle 30 freely moves axially in the release direction, thereby allowing moving the piston 28 away from the brake pads back to an original position.

Figure 4:
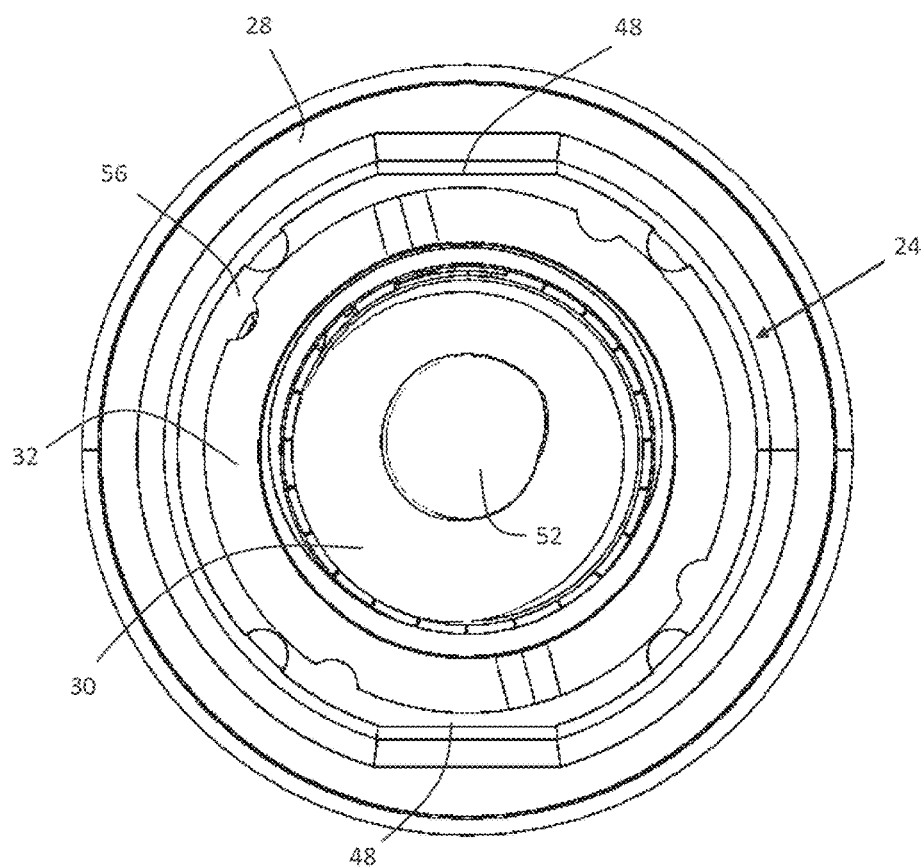
FIG. 4 is cross-section 4-4 of FIG. 2.

FIG. 4 illustrates cross-section 4-4 of the RTL actuator 24 of FIG. 2. As shown, the RTL actuator 24 may be positioned at least partially within a cavity of the piston 28. Anti-rotation features 48 between the flange 56 and the piston 28 may prevent unwanted rotation of the flange 56 relative to the piston 28, or vice versa. The anti-rotation features 48 may be a flattened substantially linear segment in an otherwise circular shape to prevent unwanted rotation. Additionally, the nut 32 may be positioned around the spindle 30 of the RTL actuator 24 to drive the spindle 30 and the flange 56 into the piston 28. A lead screw 52 may also be positioned within the spindle 30 to prevent backdrive of the spindle during and/or after a clamping operation (see FIG. 3).

Figure 5:
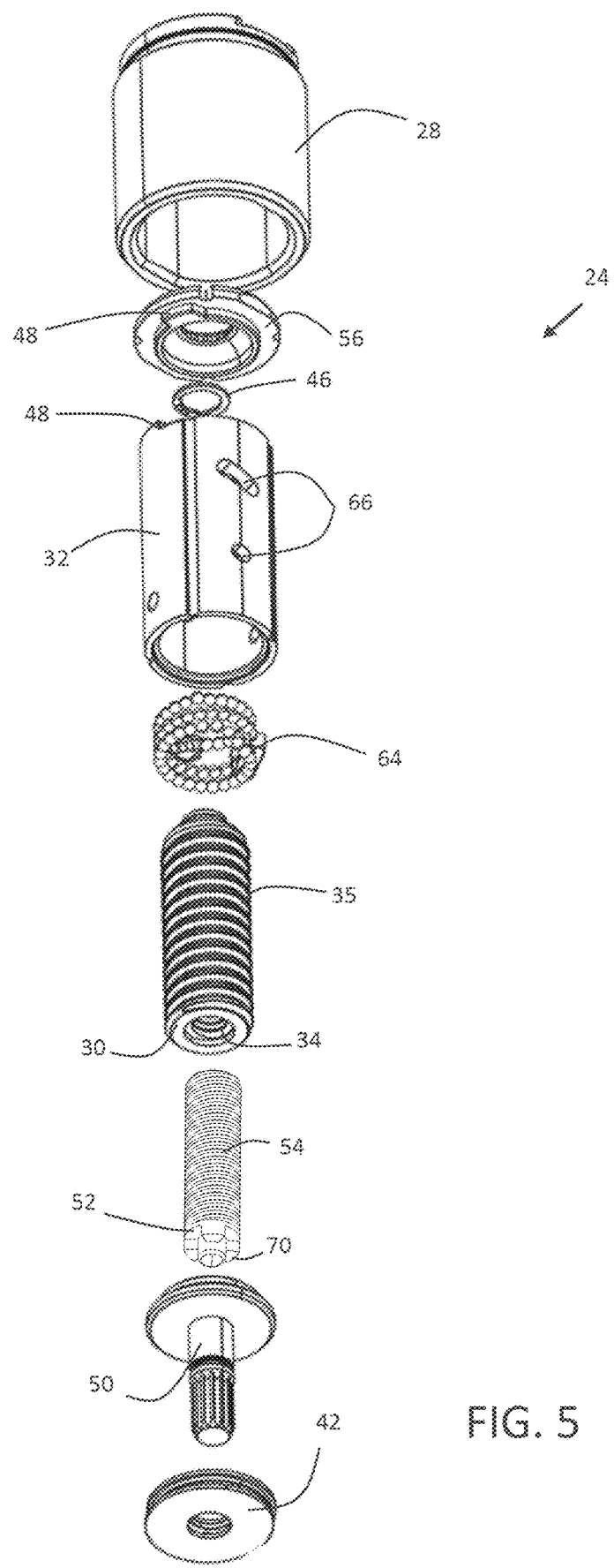
FIG. 5 is an exploded view of the rotary to linear actuator of FIG. 2.

FIG. 5 illustrates an exploded view of the RTL actuator 24 of FIG. 2. The RTL actuator 24 is at least partially positioned within a cavity of the piston 28. The RTL actuator 24 includes a lead screw 52 positioned within a channel of a spindle 30. Threading 54 of the lead screw 30 may engage internal threading 34 of the spindle 30 to allow axial movement of the spindle 30, prevent backdrive of the spindle 30 with self-lock threading, or both.

The spindle 30 may also be at least partially positioned within a nut 32 so that external threading 35 of the spindle 30 may indirectly engage threading of the nut 32 via a ball screw 64. As shown, the nut 32 may also include one or more apertures to provide ventilation, heat dissipation, fluid movement, or a combination thereof.

During operation, as discussed above, a drive shaft 50 positioned within a bearing 42 may drive the nut 32, which in turn may drive the spindle 30 into a flange 56. The flange 56 may be secured to the spindle 30 via a clip 46 and may include an anti-rotation feature 48 that mates with an anti-rotation feature 48 of the nut 32, thereby preventing unwanted rotation of the flange 56 relative to the nut 32, or vice versa. The drive shaft 50 may also engage the lead screw 52 via keying 70 of the lead screw 52 secured within keyholes of the drive shaft 50 (not shown).

Figure 6:
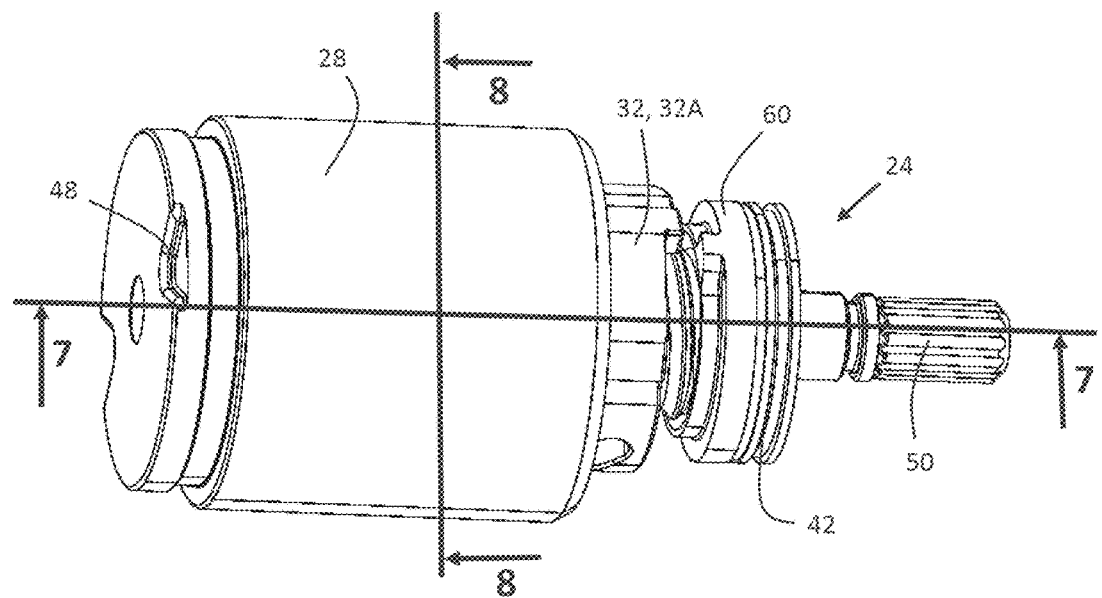
FIG. 6 is a perspective view of a rotary to linear actuator.

FIG. 6 illustrates a perspective view of a rotary to linear (RTL) actuator 24. The RTL actuator 24 includes a nut 32 positioned around a spindle (not shown) and located within a cavity of a piston 28. The spindle may be driven by a drive shaft 50 monolithically formed with the spindle. The RTL actuator 24 may also include a second nut (not shown) positioned within the first nut 32A. When the spindle rotates, the first nut 32A may drive the piston 28 in a desired direction to engage one or more brake pads. Additionally, a bearing 42 and a collar 60 may be positioned around the drive shaft 50 to aid in maintaining a position of the RTL actuator 24, aid in rotation of the drive shaft 50, or both. The piston 28 may also include one or more anti-rotation features 48 along an outer portion that engage the brake pad during operation to prevent rotation of the piston 28 relative to the brake pad, or vice versa.

Figure 7:
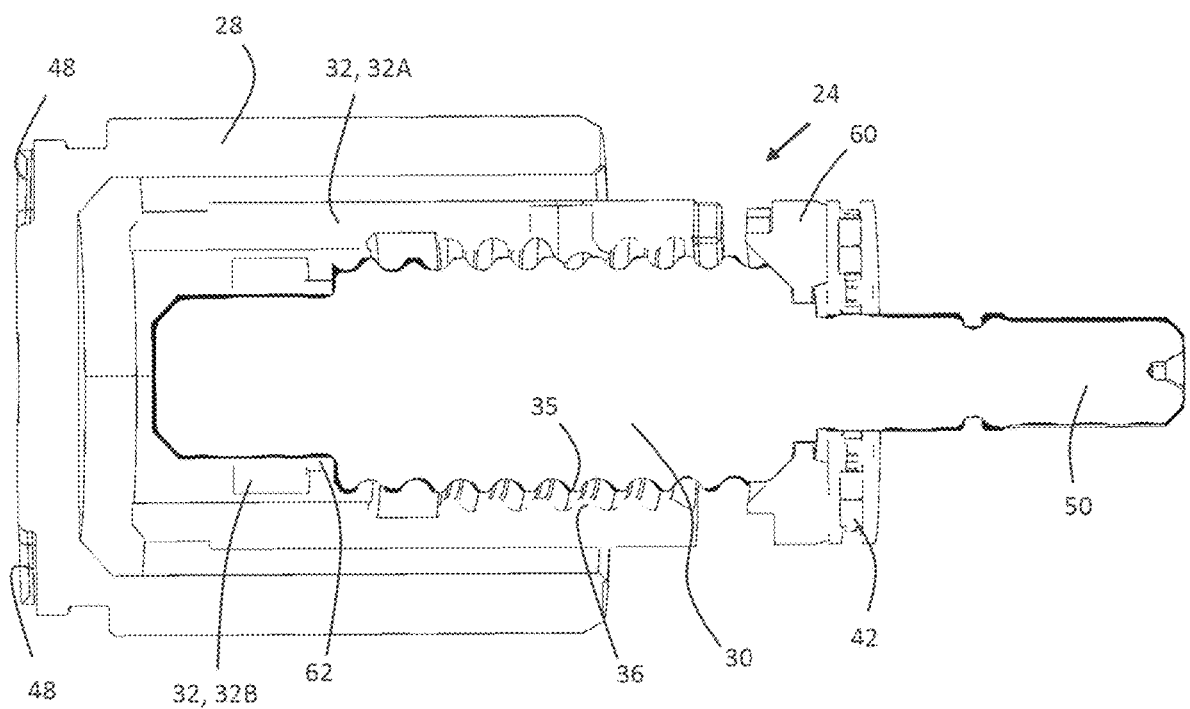
FIG. 7 is cross-section 7-7 of FIG. 6.

FIG. 7 illustrates cross-section 7-7 of the RTL actuator 24 of FIG. 6. The RTL actuator 24 includes a spindle 30 positioned at least partially within a cavity of the piston 28. The spindle 30 may include a drive shaft 50 extending through a collar 60 and a bearing 42 of the RTL actuator 24. The spindle 30 may rotate based upon rotation of the drive shaft 50 to drive a first nut 32A into contact with an inner wall of the piston 28 to move the piston 28.

As the drive shaft 50 and the spindle 30 rotate during a clamping operation, external threading 35 of the spindle 30 engages threading 36 of the first nut 32A to move the first nut 32A towards the piston 28. The external threading 35 of the spindle 30 and the threading 36 of the first nut 32A may be free of any self-lock threading, thereby allowing the first nut 32A to move in a clamping direction towards the piston 28 with higher efficiency. It should be noted that while the external threading 35 of the spindle 30 may directly engage threading 36 of the first nut 32A, one or more ball bearings positioned between the spindle 30 and the first nut 32A may facilitate the spindle 30 indirectly engaging the first nut 32A via the ball bearings (see, e.g., FIG. 5).

During clamping, the first nut 32A may contact an inner wall of the piston 28, thereby moving the piston 28 towards one or more brake pads until anti-rotation features 48 of the piston 28 engage the one or more brake pads. Once the spindle 30 nears or reaches a final clamping position in contact with the brake pads, a backdrive force may exist. The backdrive force may normally cause the first nut 32A to move undesirably in a release direction away, thereby causing the piston 28 to prematurely release from the brake pads. However, advantageously, the present RTL actuator 24 also includes a second nut 32B that moves freely axially during a clamping operation, but prevents backdrive of the spindle 30 caused by the first nut 32A due to self-lock threading existing between the second nut 32B and the spindle 30. The second nut 32A may also abut a spring 62 applying a biasing force against the spindle 30 and the second 32A. Therefore, it is envisioned that the first nut 32A may drive the piston 28 with greater efficiency due to a lack of self-lock threading, yet backdrive may advantageously be prevented due to the self-lock threading of the second nut 32B.

During a release operation, the drive shaft 50 and the spindle 30 may be rotated in an opposite direction, causing the first nut 32A and the piston 28 to release from the brake pads and return to an initial position. Additionally, the second nut 32B may freely move back to its original position based on the engaged threading between the second nut 32B and the spindle 30.

Figure 8:
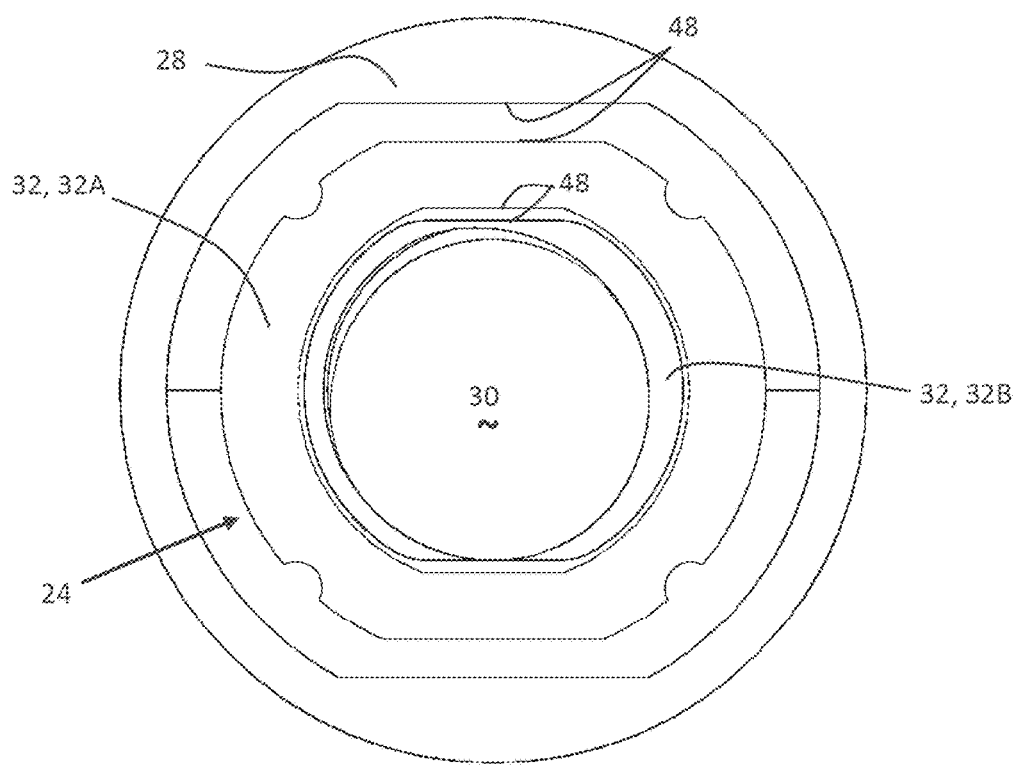
FIG. 8 is cross-section 8-8 of FIG. 6.

FIG. 8 illustrates cross-section 8-8 of the RTL actuator 24 of FIG. 6. As shown, the RTL actuator 24 may be positioned at least partially within a cavity of the piston 28. Anti-rotation features 48 between the first nut 32A and the piston 28 may prevent unwanted rotation of the first nut 32A relative to the piston 28, or vice versa. As illustrated, the anti-rotation features 48 may be a flattened substantially linear segment in an otherwise circular shape to prevent unwanted rotation. Additionally, the first nut 32A may be positioned around the second nut 32B and the spindle 30. Anti-rotation features 48 also exist between the first nut 32A and the second nut 32B to prevent unwanted rotation of the second nut 32B relative to the first nut 32A, or vice versa.

Figure 9:
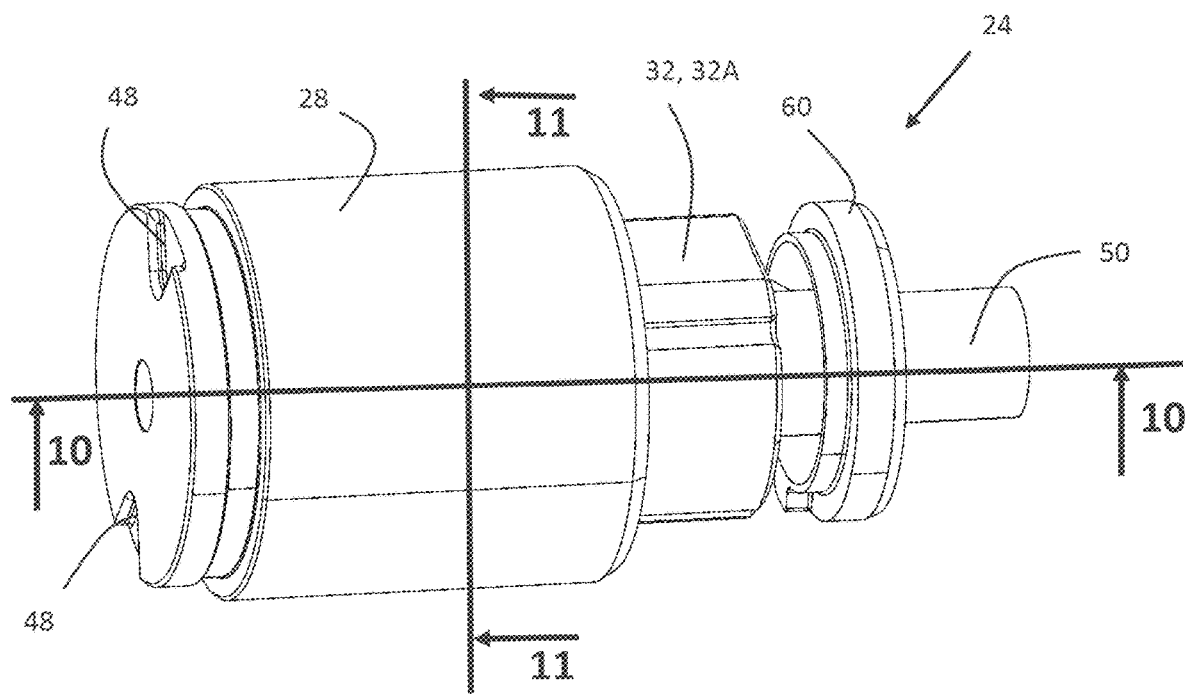
FIG. 9 is a perspective view of a rotary to linear actuator.

FIG. 9 illustrates a perspective view of a rotary to linear (RTL) actuator 24. The RTL actuator 24 includes a nut 32 positioned around a spindle (not shown) and located within a cavity of a piston 28. The spindle may be drive by a drive shaft 50 connected to the spindle. The RTL actuator 24 may also include a second nut (not shown) positioned within the first nut 32A. When the spindle rotates, the first nut 32A may drive the piston 28 in a desired direction to engage one or more brake pads. Additionally, a collar 50 may be positioned around the drive shaft 50 to aid in maintaining a position of the RTL actuator 24 during operation. The piston 28 may also include one or more anti-rotation features 48 along an outer portion that engage the brake pad during operation to prevent rotation of the piston 28 relative to the brake pad, or vice versa.

Figure 10:
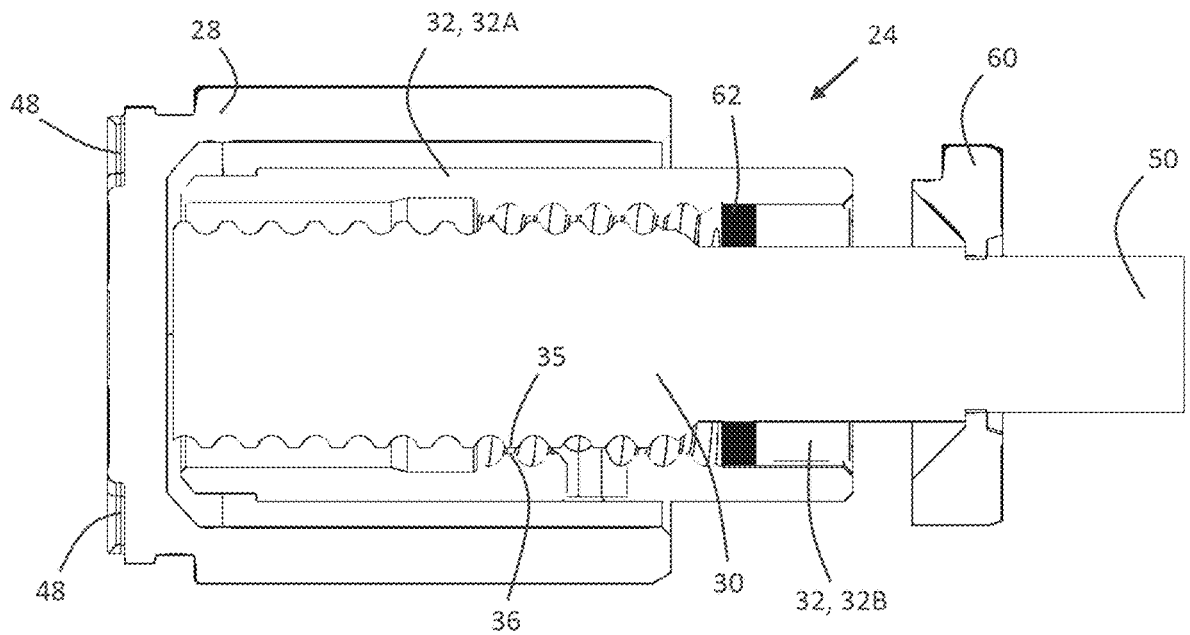
FIG. 10 is cross-section 10-10 of FIG. 9.

FIG. 10 illustrates cross-section 10-10 of the RTL actuator 24 of FIG. 9. The RTL actuator 24 includes a spindle 30 positioned at least partially within a cavity of the piston 28. The spindle 30 may include a drive shaft 50 extending through a collar 60 of the RTL actuator 24. The spindle may rotate based upon rotation of the drive shaft 50 to drive a first nut 32A into contact with an inner wall of the piston 20 to move the piston 28.

As the drive shaft 50 and the spindle 30 rotate during a clamping operation, external threading 35 of the spindle 30 engages threading 36 of the first nut 32A to move the first nut 32A towards the piston 28. The external threading 35 of the spindle 30 and the threading 36 of the first nut 32A may be free of any self-lock threading, thereby allowing the first nut 32A to move in a clamping direction towards the piston 28 with higher efficiency. It should be noted that while the external threading 35 of the spindle 30 may directly engage threading 36 of the first nut 32A, one or more ball bearings positioned between the spindle 30 and the first nut 32A may facilitate the spindle 30 indirectly engaging the first nut 32A via the ball bearings (see, e.g., FIG. 5).

During clamping, the first nut 32A may contact an inner wall of the piston 28, thereby moving the piston 28 towards one or more brake pads until anti-rotation features 48 of the piston 28 engage the one or more brake pads. Once the spindle 30 nears or reaches a final clamping position in contact with the brake pads, a backdrive force may exist. The backdrive force may normally cause the first nut 32A to move undesirably in a release direction away, thereby causing the piston 28 to prematurely release from the brake pads. However, similar to the RTL actuator 24 shown in FIGS. 6-8, the present RTL actuator 24 also includes a second nut 32B that allows for rotation of the spindle 30 during a clamping operation, but prevents backdrive of the spindle 30 caused by the first nut 32A due to self-lock threading existing between the second nut 32B and the spindle 30. The second nut 32A may also abut a spring 62 applying a biasing force against the spindle 30 and the second 32A. Therefore, it is envisioned that the first nut 32A may drive the piston 28 with greater efficiency due to a lack of self-lock threading, yet backdrive may advantageously be prevented due to the self-lock threading of the second nut 32B. Additionally, during a release operation, the drive shaft 50 and the spindle 30 may be rotated in an opposite direction, causing the first nut 32A and the piston 28 to release from the brake pads and return to an initial position.

Figure 11:
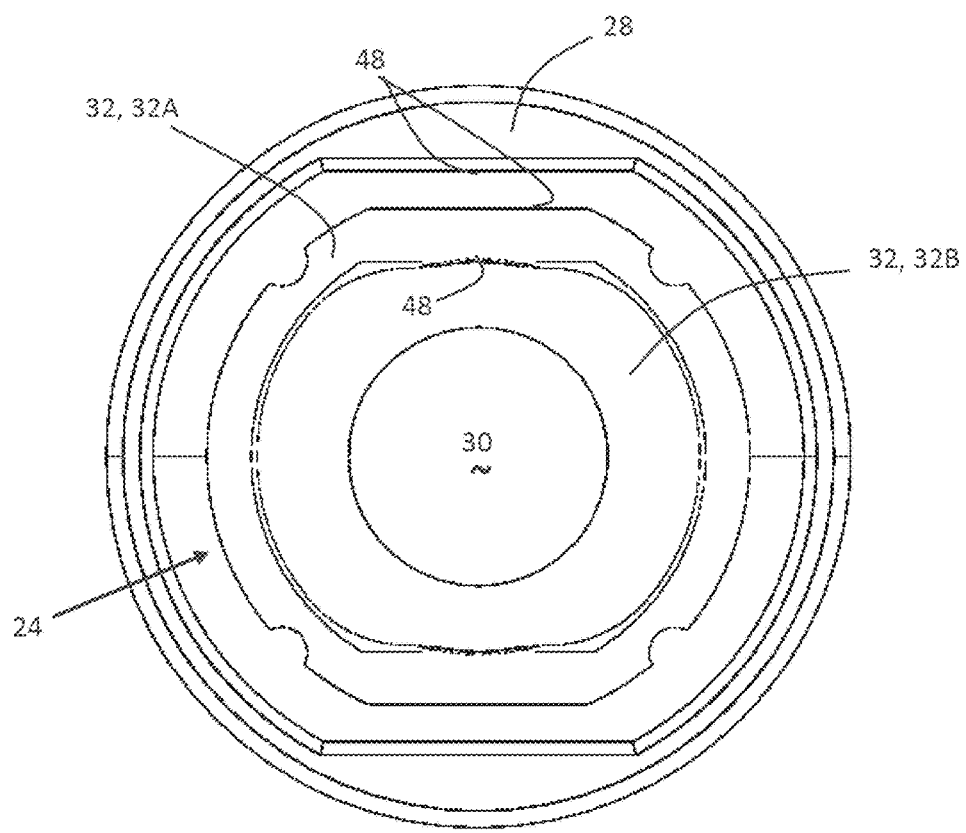
FIG. 11 is cross-section 11-11 of FIG. 9.

FIG. 11 illustrates cross-section 11-11 of the RTL actuator 24 of FIG. 9. As shown, the RTL actuator 24 may be positioned at least partially within a cavity of the piston 28. Anti-rotation features 48 between the first nut 32A and the piston 28 may prevent unwanted rotation of the first nut 32A relative to the piston 28, or vice versa. As illustrated, the anti-rotation features 48 may be a flattened substantially linear segment in an otherwise circular shape to prevent unwanted rotation. Additionally, the first nut 32A may be positioned around the second nut 32B and the spindle 30. Anti-rotation features 48 also exist between the first nut 32A and the second nut 32B to prevent unwanted rotation of the second nut 32B relative to the first nut 32A, or vice versa.

Figure 12:
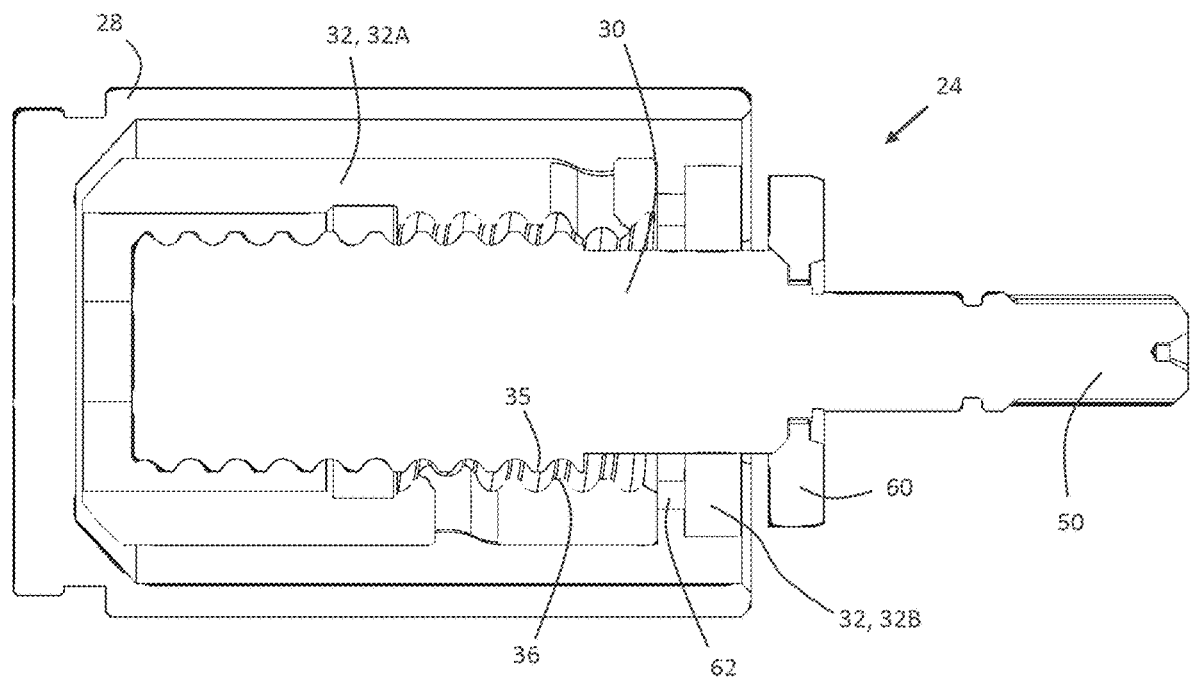
FIG. 12 is a cross-section of a rotary to linear actuator.

FIG. 12 illustrates a cross-sectional view of a rotary to linear (RTL) actuator 24 similar to those shown in FIGS. 1-11. As discussed above, the RTL actuator 24 includes a spindle 30 positioned at least partially within a cavity of the piston 28. The spindle 30 may include a drive shaft 50 extending through a collar 50 of the RTL actuator 24. The spindle may rotate based upon rotation of the drive shaft 50 to drive a first nut 32A into contact with an inner wall of the piston 20 to move the piston 28.

As the drive shaft 50 and the spindle 30 rotate during a clamping operation, external threading 35 of the spindle 30 engages threading 36 of the first nut 32A to move the first nut 32A towards the piston 28. The external threading 35 of the spindle 30 and the threading 36 of the first nut 32A may be free of any self-lock threading, thereby allowing the first nut 32A to move in a clamping direction towards the piston 28 with higher efficiency. It should be noted that while the external threading 35 of the spindle 30 may directly engage threading 36 of the first nut 32A, one or more ball bearings positioned between the spindle 30 and the first nut 32A may facilitate the spindle 30 indirectly engaging the first nut 32A via the ball bearings (see, e.g., FIG. 5).

During clamping, the first nut 32A may contact an inner wall of the piston 28, thereby moving the piston 28 towards one or more brake pads until anti-rotation features 48 of the piston 28 engage the one or more brake pads. Once the spindle 30 nears or reaches a final clamping position in contact with the brake pads, a backdrive force may exist. The backdrive force may normally cause the first nut 32A to move undesirably in a release direction away, thereby causing the piston 28 to prematurely release from the brake pads. However, similar to the RTL actuator 24 shown in FIGS. 9-11, the present RTL actuator 24 also includes a second nut 32B positioned adjacent to the first nut 32A that allows for rotation of the spindle 30 during a clamping operation, but prevents backdrive of the spindle 30 caused by the first nut 32A due to self-lock threading existing between the second nut 32B and the spindle 30. The second nut 32A may also abut a spring 62 applying a biasing force against the spindle 30 and the second 32A. Therefore, it is envisioned that the first nut 32A may drive the piston 28 with greater efficiency due to a lack of self-lock threading, yet backdrive may advantageously be prevented due to the self-lock threading of the second nut 32B. Furthermore, during a release operation, the drive shaft 50 and the spindle 30 may be rotated in an opposite direction, causing the first nut 32A and the piston 28 to release from the brake pads and return to an initial position.

Figure 13:
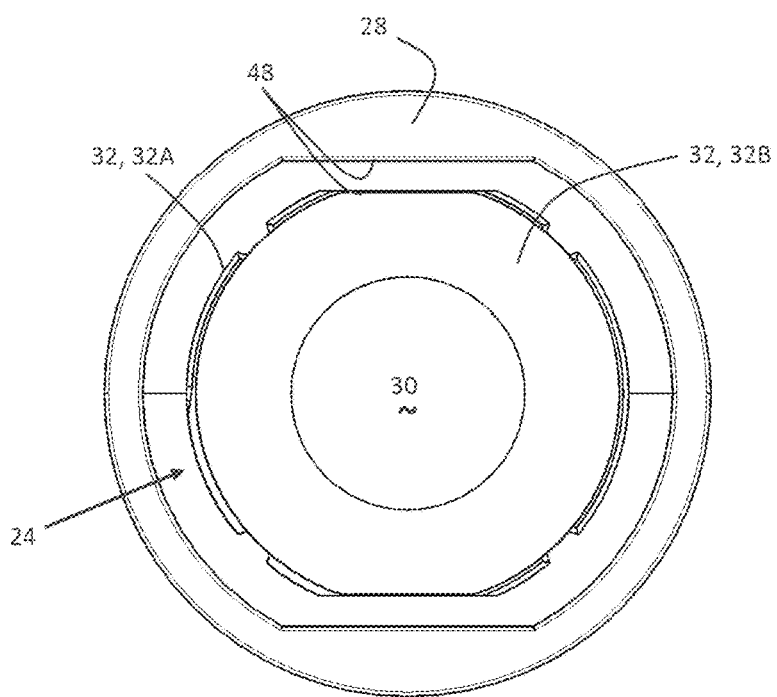
FIG. 13 is an additional cross-section of the rotary to linear actuator illustrated in FIG. 12.

FIG. 13 illustrates an additional cross-section of the RTL actuator 24 shown in FIG. 12 taken transverse to an axis of rotation of the spindle 30. The RTL actuator 24 may be positioned at least partially within a cavity of the piston 28. Anti-rotation features 48 shown as substantially linear segments between the first nut 32A and the piston 28 may prevent unwanted rotation of the first nut 32A relative to the piston 28, or vice versa. Additionally, the first nut 32A may be positioned adjacent to the second nut 32B, and both the first nut 32A and the second nut 32B may be positioned around the spindle 30.

While a single RTL actuator has been discussed herein, more than one RTL actuator may be utilized to drive a single piston. Similarly, a single RTL actuator may drive more than one piston. For example, a single RTL actuator may drive twin pistons of a brake system. The RTL actuator may include a plurality of conversion stages that may split an input received by the drive shaft of the RTL actuator to drive both twin pistons. Thus, it may be gleaned from the present teachings that the RTL actuator may be utilized in a variety of configurations and may be highly tunable based upon a given application.

Figure 14:
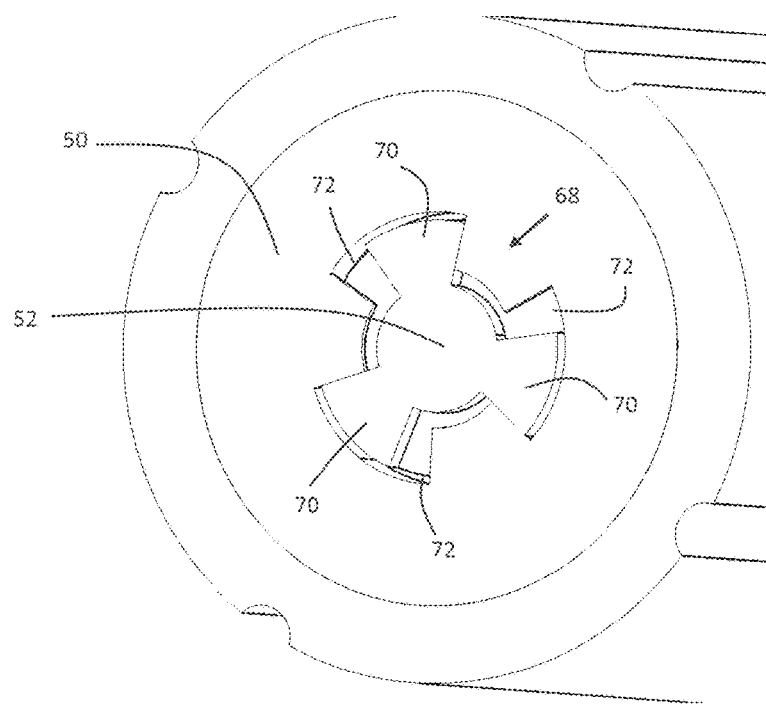
FIG. 14 is a cross-section of a clutch of a rotary to linear actuator.

FIG. 14 illustrates a cross-section of a clutch 68 of a rotary to linear actuator. The clutch 68 may exist to engage a lead screw 52 and a drive shaft 50 of the rotary to linear actuator. During operation, the drive shaft 50 may drive a nut of the rotary to linear actuator (see, e.g., FIG. 3), the lead screw 52, or both. However, while the drive shaft 50 may be connected to the lead screw 52, the lead screw 52 may include keying 70 positioned within keyholes 72 of the drive shaft. The keying 70 may allow for the lead screw 52 to incrementally rotate within the keyholes 72 of the drive shaft 50 so that the lead screw 52 may incrementally rotate relative to the drive shaft 50, yet the lead screw 52 may be prevented from freely rotating due to the keyholes 72 of the drive shaft 50. The present teachings advantageously utilize a clutch 68 to aid in self-locking of the lead screw 52 and a spindle of the rotary to linear actuator during a clamping hold operation, a release operation, or both.

Figures 15A, 15B, 15C:
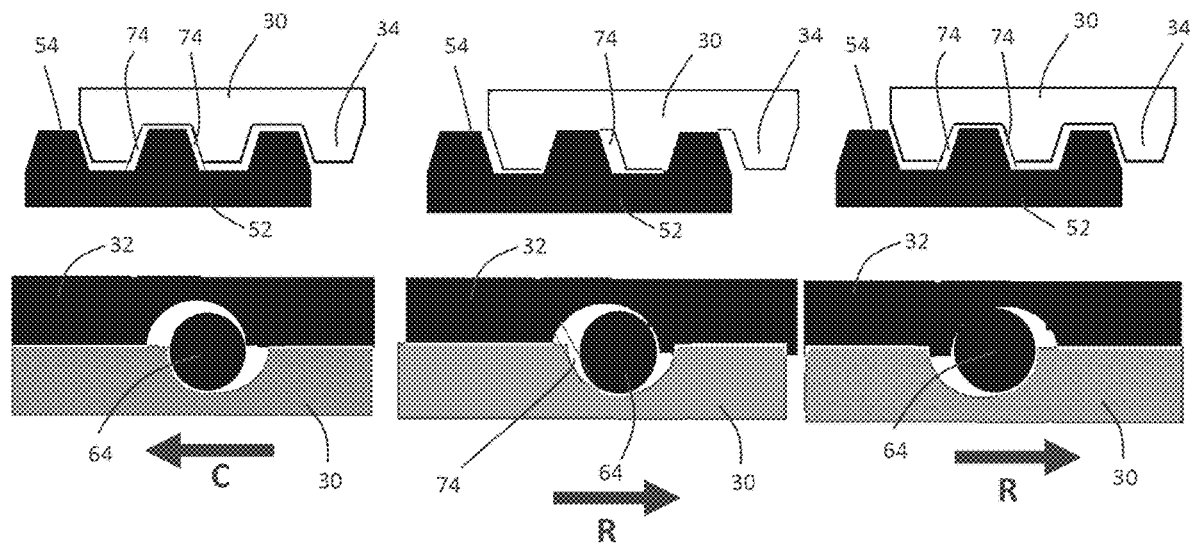
FIG. 15A illustrates the backlash present during a clamping operation.
FIG. 15B illustrates the backlash present when a clamping force is being held by the rotary to linear actuator.
FIG. 15C illustrates the backlash present during a release operation.

FIG. 15A illustrates backlash 74 present within the rotary to linear actuator during a clamping operation. During clamping, rotational movement of the nut 32 may translate into a linear movement in the clamping direction (C) of the spindle 30 via balls of the ball screw 64. As shown, there is not backlash present between the ball screw 64 and the nut 32 or between the ball screw 64 and the spindle 30. However, during the clamping operation, backlash 74 exists between internal threading 34 of the spindle 30 and threading 54 of the lead screw 52, thereby allowing the spindle 30 to substantially freely and efficiently move relative to the lead screw 52.

Conversely, as shown in FIG. 15B, backlash 74 exists between the ball screw 64 and the spindle 30 when a clamping load is being applied (i.e., during a hold operation). During the hold operation, the backlash 74 between the ball screw 64 and spindle 30 would generally create unwanted backdrive of the spindle 30 by allowing the spindle 30 to move within the backlash space until the spindle 30 contacts the ball screw 64, thereby resulting in a decrease in clamping force. However, advantageously, the engagement between the spindle 30 and the lead screw 52 prevent backdrive because backlash 74 is no longer present between the spindle 30 and the lead screw 52 in a release direction (R). Thus, the lead screw 52 is fully engaged to the spindle 30 to prevent any unwanted movement in the release direction (R) even though the backlash 74 present between the ball screw 64 and the spindle 30 would generally allow for backdrive.

Similar to the clamping operation illustrated in FIG. 15A, FIG. 15C illustrates the backlash 74 present during a release operation. During release, the nut 32 is rotated in a direction opposing the rotational direction of the clamping operation. As a result, the nut 32 translates the rotational movement into a linear movement of the spindle 30 in the release direction (R) via the ball screw 64. As illustrated, no backlash exists between the ball screw 64 and spindle 30 or the ball screw 64 and the nut 32. Additionally, during the release operation, backlash 74 exists between the internal threading 34 of the spindle 30 and the threading 54 of the lead screw 52 so that the spindle 30 may substantially freely move relative to the lead screw 52. Furthermore, it should be noted that at any point during the operation of the rotary to linear actuator, the largest amount of backlash possible between the ball screw 64 and the nut 32 and a backlash between the ball screw 64 and the spindle 30 is less than the largest amount of backlash possible between the lead screw 52 and the spindle 30.

ELEMENT LIST

20 Brake System
22 Caliper Housing

24 Rotary to Linear Actuator
26 Piston Bore
28 Piston
30 Spindle
32 Nut
32A First Nut
32B Second Nut
34 Spindle Internal Threading
35 Spindle External Threading
36 Nut Threading
38 Piston Seal
40 Boot
42 Bearing
44 Bushing
46 Clip
48 Anti-Rotation Feature
50 Drive Shaft
52 Lead Screw
54 Lead Screw Threading
56 Flange
58 O-Ring
60 Collar
62 Spring
64 Ball Screw
66 Aperture
68 Clutch
70 Keying
72 Keyhole
74 Gap
C Clamping Direction
R Release Direction The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer, or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of within a range of 100+/−15.

What is claimed is:
1. A rotary to linear actuator comprising:
(a) a nut having a threading;
(b) a spindle having an external threading and an internal threading, wherein the spindle is positioned at least partially within the nut;
(c) drive shaft in communication with the nut to rotate the nut, wherein rotation of the drive shaft rotates the nut, and the threading of the nut engages the external threading of the spindle to move the spindle axially away from the drive shaft to drive a piston; and
(d) a lead screw positioned within a channel of the spindle, wherein the spindle moves freely along threading of the lead screw in a clamping direction, but the threading of the lead screw and the internal threading of the spindle prevent the spindle from prematurely moving in an opposing release direction due to backdrive caused by a clamping operation.

2. The rotary to linear actuator of claim 1, wherein the spindle is secured to a flange and the flange contacts an inner surface of the piston to drive the piston.

3. The rotary to linear actuator of claim 1, wherein the nut and the drive shaft are engaged to prevent axial movement and rotation of the nut relative to the drive shaft, prevent axial movement and rotation of the drive shaft relative to the nut, or both.

4. The rotary to linear actuator of claim 1, wherein the piston is moved to a clamping position in a clamping direction to engage a brake pad of a brake system, and threading of the lead screw self-locks with internal threading of the spindle to prevent backdrive of the spindle in a release direction opposite the clamping direction.

5. The rotary to linear actuator of claim 4, wherein the threading of the nut and the external threading of the spindle are free of self-locking that prevents backdrive.

6. The rotary to linear actuator of claim 1, wherein a ball screw is positioned between the nut and the spindle to engage the threading of the nut, the external threading of the spindle, or both.

7. The rotary to linear actuator of claim 2, wherein the flange includes an anti-rotation feature that engages the piston and prevents rotation of the flange relative to the piston, or vice versa.

8. The rotary to linear actuator of claim 1, wherein the nut and the spindle are at least partially positioned within a cavity of the piston.

9. The rotary to linear actuator of claim 1, wherein the nut and the drive shaft remain axially stationary and rotate about an axis of rotation.

10. The rotary to linear actuator of claim 6, wherein the lead screw is in communication with the drive shaft via a clutch, the ball screw via the clutch, or both, and the lead screw incrementally rotates in a clockwise direction, a counterclockwise direction, or both relative to the drive shaft, the ball screw, or both during operation of the rotary to linear actuator based upon the clutch.

11. The rotary to linear actuator of claim 1, wherein a ball screw is positioned between the nut and the spindle and backlash between the ball screw and the nut, and the ball screw and the spindle, is less than backlash between internal threading of the spindle and threading of the lead screw.

12. A rotary to linear actuator comprising:
(a) a first nut having a threading;
(b) a second nut having a threading;
(c) a spindle having a threading and positioned at least partially within the first nut and the second nut; and
(d) a drive shaft connected to the spindle to rotate the spindle;
wherein rotation of the drive shaft during a clamping operation rotates the spindle, and the threading of the spindle engages the threading of the first nut to move the first nut axially away from the drive shaft to drive a piston in a clamping direction while the second nut moves freely along the threading of the spindle; and
wherein backdrive of the piston and the first nut in a release direction opposing the clamping direction is prevented by the threading of the second nut self-locking with the threading of the spindle.

13. The rotary to linear actuator of claim 12, wherein the threading of the first nut is free of self-locking with the threading of the spindle.

14. The rotary to linear actuator of claim 12, wherein the second nut remains axially stationary during operation of the rotary to linear actuator.

15. The rotary to linear actuator of claim 12, wherein an anti-rotation feature between the first nut and the second nut prevents rotation of the second nut relative to the first nut, or vice versa.

16. The rotary to linear actuator of claim 12, wherein the second nut is positioned at least partially within the first nut.

17. The rotary to linear actuator of claim 12, wherein the second nut is located adjacent to the first nut.

\* \* \* \* \*